US011928892B2

(12) United States Patent
Jang

(10) Patent No.: US 11,928,892 B2
(45) Date of Patent: Mar. 12, 2024

(54) MOTION RECOGNITION APPARATUS USING ToF SENSOR AND METHOD FOR OPERATING THE SAME

(71) Applicant: SK hynix Inc., Icheon-si (KR)

(72) Inventor: Jae Hyung Jang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 164 days.

(21) Appl. No.: 17/340,854

(22) Filed: Jun. 7, 2021

(65) Prior Publication Data

US 2022/0019777 A1 Jan. 20, 2022

(30) Foreign Application Priority Data

Jul. 20, 2020 (KR) .................... 10-2020-0089572

(51) Int. Cl.
| | |
|---|---|
| *G06K 9/00* | (2022.01) |
| *G06N 3/04* | (2023.01) |
| *G06T 7/55* | (2017.01) |
| *G06V 40/20* | (2022.01) |
| *H04N 5/225* | (2006.01) |
| *H04N 23/56* | (2023.01) |

(52) U.S. Cl.
CPC .............. *G06V 40/20* (2022.01); *G06N 3/04* (2013.01); *G06T 7/55* (2017.01); *H04N 23/56* (2023.01); *G06T 2207/10028* (2013.01); *G06T 2207/10048* (2013.01); *G06T 2207/20081* (2013.01); *G06T 2207/20084* (2013.01)

(58) Field of Classification Search
CPC . G06V 40/20; G06T 7/55; G06T 2207/10028; G06T 2207/10048; G06T 2207/20081; G06T 2207/20084; H04N 23/56; G06N 3/04
See application file for complete search history.

(56) References Cited

U.S. PATENT DOCUMENTS

| | | | | |
|---|---|---|---|---|
| 8,890,813 | B2* | 11/2014 | Minnen | G06V 40/107 345/158 |
| 9,983,779 | B2* | 5/2018 | Park | G06F 3/017 |
| 10,557,925 | B2* | 2/2020 | Wang | G01S 17/10 |
| 10,873,738 | B2* | 12/2020 | Retterath | H04N 13/204 |
| 11,259,002 | B2* | 2/2022 | Le Dortz | G01S 7/4863 |

(Continued)

FOREIGN PATENT DOCUMENTS

| | | |
|---|---|---|
| CN | 102547172 A | 7/2012 |
| CN | 102999152 A | 3/2013 |

(Continued)

Primary Examiner — Gregory M Desire
(74) Attorney, Agent, or Firm — Perkins Coie LLP

(57) ABSTRACT

Methods for operating a motion recognition apparatus are disclosed. In some implementations, a method for recognizing a motion or gesture of an object may include operating an optical sensor device to capture light reflected from the object under illumination by light emitted toward the object, generating, by comparing the emitted light to the reflected light, a depth image including distance information indicating a distance between the optical sensor device and the object, generating, based on the light reflected from the object, an infrared image including infrared image information associated with the object, and determining the motion of the object based on at least one of the depth image and the infrared image.

20 Claims, 12 Drawing Sheets

(56) References Cited

U.S. PATENT DOCUMENTS

| | | | |
|---|---|---|---|
| 2013/0229491 A1* | 9/2013 | Kim | G06F 3/0304 |
| | | | 348/46 |
| 2014/0282224 A1 | 9/2014 | Pedley | |
| 2017/0068393 A1 | 3/2017 | Viswanathan et al. | |
| 2021/0144357 A1* | 5/2021 | Kim | H04N 13/271 |

FOREIGN PATENT DOCUMENTS

| | | | |
|---|---|---|---|
| CN | 106504283 A | 3/2017 |
| CN | 107357356 A | 11/2017 |
| CN | 109508670 A | 3/2019 |
| CN | 109710071 A | 5/2019 |
| CN | 110221732 A | 9/2019 |
| JP | 6358552 B2 | 7/2018 |
| JP | 6422306 B2 | 11/2018 |

\* cited by examiner

MOTION RECOGNITION APPARATUS USING ToF SENSOR AND METHOD FOR OPERATING THE SAME

CROSS-REFERENCES TO RELATED APPLICATION

This patent document claims the priority and benefits of Korean Patent Application No. 10-2020-0089572 filed on Jul. 20, 2020, which is incorporated herein by reference in its entirety as part of the disclosed technology of this patent document.

TECHNICAL FIELD

The technology and implementations disclosed in this patent document generally relate to a motion recognition apparatus using a ToF sensor using a pixel capable of sensing a distance to a target object, and a method for operating the same.

BACKGROUND

An image sensor is a device that is used to convert light into electrical signals using a photosensitive semiconductor material reacting to light. With the development of automotive, medical, computer and communication industries, the demand for high-performance image sensors is increasing in various fields such as smartphones, digital cameras, game machines, the Internet of Things, robots, security cameras and medical micro cameras.

Image sensors may be generally divided into CCD (charge coupled device) image sensors and CMOS (complementary metal oxide semiconductor) image sensors. CCD image sensors offer a better image quality, but they tend to consume more power and are larger as compared to CMOS image sensors. CMOS image sensors are smaller in size and consume less power than the CCD image sensors. In addition, the CMOS image sensors may be implemented using many different scanning schemes. Furthermore, CMOS sensors are fabricated using the CMOS fabrication technology, and thus CMOS image sensors and other signal processing circuitry can be integrated into a single chip, enabling the production of miniaturized image sensors at a lower cost. For these reasons, a CMOS image sensing device has been widely used due to its characteristic more appropriate to a mobile device.

SUMMARY

The embodiments of the disclosed technology relate to a motion recognition apparatus using a ToF sensor capable of, among other things, recognizing a motion by changing a mode depending on a recognition step, and a method for operating the same.

In an embodiment of the disclosed technology, a method for recognizing a motion or gesture of an object may include operating an optical sensor device to capture light reflected from the object under illumination by light emitted toward the object, generating, by comparing the emitted light to the reflected light, a depth image including distance information indicating a distance between the optical sensor device and the object, generating, based on the light reflected from the object, an infrared image including infrared image information associated with the object, and determining the motion of the object based on at least one of the depth image and the infrared image.

In another embodiment of the disclosed technology, motion recognition apparatus using a time of flight (ToF) sensor may include an image sensing device comprising a plurality of image sensor pixels responsive to light from an object to produce pixel output signals carrying image data representing captured images of the object and configured to generate first, second and third image data by operating the plurality of image sensor pixels according to first, second, and third operation modes, respectively, an image processor in communication with the image sensing device and configured to generate a first depth image including first distance information indicating a distance between the image sensing device and the object, a second depth image including second distance information indicating a distance between the image sensing device and the object and an infrared image based on the first, second and third image data, respectively, and an image analysis unit in communication with the image processor and configured to determine whether the first depth image satisfies a first mode transition condition and whether the second depth image satisfies a second mode transition condition, and determine a user input based on the infrared image.

In another embodiment of the disclosed technology, a method for operating a motion recognition apparatus using a ToF (time of flight) sensor may include: generating a depth image including distance information on a target object; and generating an IR (infrared) image including infrared image information on the target object, depending on a result of analyzing the depth image.

In another embodiment of the disclosed technology, a motion recognition apparatus using a ToF sensor may include: an image sensing device configured to generate first to third image data by driving pixels according to first to third operation modes, respectively; an image processor configured to generate a first depth image, a second depth image and an IR image based on the first to third image data, respectively; and an image analysis unit configured to determine whether the first depth image satisfies a first mode transition condition and whether the second depth image satisfies a second mode transition condition, and determine a user input based on the IR image.

In some embodiments of the disclosed technology, by analyzing a depth image, it is possible to move a user to a position where a motion can be recognized, and by analyzing an IR image, it is possible to accurately recognize a quick motion.

Also, since a motion is recognized using a depth image or an IR image, the motion may be accurately recognized even in environments with very low illumination and even in the case where a user wears clothes in a color similar to a skin color or even without separate special gloves for recognition.

DETAILED DESCRIPTION

Hereinafter, various embodiments of the disclosed technology will be disclosed with reference to the accompanying drawings. However, the description is not intended to limit the disclosed technology to particular embodiments, and it should be construed as including various modifications, equivalents, and/or alternatives according to the embodiments of the disclosed technology.

The three-dimensional (3D) vision is a growing research field that includes methods for acquiring the depth information, triangulation, time-of-flight or interferometry, by using an image sensor. Time-of-Flight (TOF) technology use used in the 3D vision devices for various applications including security, medical devices, automobiles, game consoles, VR/AR and mobile devices, by providing 3D imaging using a TOF sensor with a low-cost CMOS pixel array and an active modulated light source. Some implementations of TOF sensors may be divided into a direct TOF sensor and an indirect TOF sensor. In the direct TOF sensor, a distance between the TOF sensor and an object is measured by computing a round trip time of light between the object and the TOF sensor based on emitted light from the light source and reflected light from the object. The direct TOF sensor is generally used for automobiles because it is advantageous for long distance measurement. In the indirect TOF sensor, a distance to an object is measured by using a phase difference of the emitted light and reflected light. The indirect TOF sensor is used for a game machine or a mobile camera that is used at a shorter distance and requires a faster processing speed. The indirect TOF sensor can be implemented using a simple circuit at a low cost.

In some implementations, the indirect ToF sensor may utilize a current-assisted photonic demodulator (CAPD) technique by which electrons generated in a sensor pixel by using majority current through application of a substrate voltage are detected by using the voltage difference of an electric field. Because the CAPD uses majority current, the CAPD may quickly detect electrons, and may detect even deeply formed electrons, which results in excellent efficiency.

ToF sensors measure distances using the time that light travels between two points, from the sensor's emitter to a target object and then back to the sensor's receiver. Both the indirect and direct ToF sensors can simultaneously measure the light intensity and distance for each pixel in a scene. Direct ToF sensors transmit short pulses of light and then measure the time it takes for some of the emitted light to come back. Indirect ToF sensors transmit continuous, modulated light and measure the phase of the reflected light to calculate the distance to an object.

Some embodiments of the disclosed technology can utilize both the direct ToF sensor and the indirect ToF sensor in performing the motion recognition operations.

Figure 1:
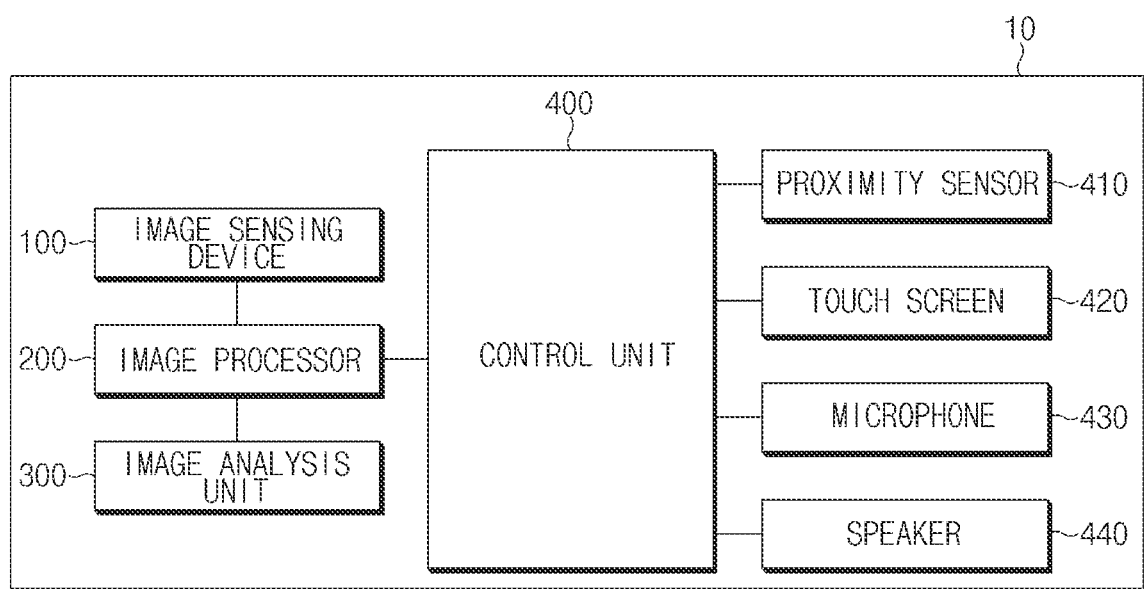
FIG. 1 illustrates an example of a motion recognition apparatus using a ToF sensor based on an embodiment of the disclosed technology.

FIG. 1 illustrates an example of a motion recognition apparatus using a ToF sensor based on an embodiment of the disclosed technology.

Referring to FIG. 1, a motion recognition apparatus 10 using a ToF sensor may recognize human motions or gestures based on captured images and/or depth information (e.g., distance to an object in motion), and may process the captured images and/or the depth information to interpret the human motions or gestures. The interpretation of the human motions or gestures can be used in various applications such as a sign language interpretation and security cameras that can detect and interpret human motions or gestures. In some implementations, the motion recognition apparatus 10 may recognize motions of human hands. In some implementations, the motion recognition apparatus 10 may recognize motions of exposed body parts if it is configured to detect human skin colors.

For example, operations of the motion recognition apparatus 10 may include processing captured motions of human hands associated with a sign language to interpret the sign language and generate audio or video data indicating the sign language.

In some implementations, the motion recognition apparatus 10 may be used to verify the identity of a user by recognizing human motions or gestures. For example, the motion recognition apparatus 10 verify the identity of a user by capturing motions of the user and determining whether the captured motions of the user match a predetermined human motion/gesture security key.

In some implementations, the motion recognition apparatus 10 may be used in a video game system to perceive a video game player's movements.

In the above examples, the motion recognition apparatus 10 may include a computing device that can process raw data to generate the audio or video data indicating the sign language, the identity of the user, or input signals to the video game system. In some implementations, the motion recognition apparatus 10 may be a mobile terminal such as a cellular phone, a PCS (Personal Communications Services) phone and a synchronous/asynchronous IMT-2000 (International Mobile Telecommunication-2000). Besides, the motion recognition apparatus 10 may be a palm PC (palm Personal Computer), a PDA (Personal Digital Assistant), a smart phone, a WAP (Wireless Application Protocol) phone, a mobile play-station, a tablet PC, a PC, a notebook, or a kiosk device.

The motion recognition apparatus 10 may include an image sensing device 100, an image processor 200, an image analysis unit 300, a control unit 400, a proximity sensor 410, a touch screen 420, a microphone 430, and a speaker 440.

The image sensing device 100 may generate first to third image data according to first to third operation modes, respectively. The first and second image data may indicate image data or image sensor data that is obtained by sensing the phase difference between modulated light emitted from the motion recognition apparatus 10 or another light source nearby and returning light that is reflected from a target object 1. A distance to the target object 1 may be measured using a TOF (time-of-flight) method based on the phase difference between the emitted light and the returning light. On the other hand, the third image data may indicate image data that is obtained by sensing the intensity of infrared light that is reflected from the target object 1.

The image sensing device 100 may operate in one of the first to third operation modes, and an operation mode of the image sensing device 100 may be controlled by the image processor 200. In operation, the image sensing device 100 may generate image data (e.g., one of the first to third image data) by operating according to an operation mode determined by the image processor 200, and may transfer the generated image data to the image processor 200.

The first operation mode and the second operation mode are operation modes for obtaining the same type of first image data and second image data, but modulation frequencies and demodulation frequencies in the first operation mode and the second operation mode may be different from each other. For example, a modulation frequency of the first operation mode may be lower than a modulation frequency of the second operation mode.

The third operation mode may be an operation mode for obtaining third image data. In another embodiment, the third operation mode may be an operation mode for obtaining not only third image data but also fourth image data together. The fourth image data may include image data that is obtained by sensing the intensity of visible light reflected from the target object 1.

The image sensing device 100 can be operated in each of the first to third operation modes as will be discussed below with reference to FIGS. 6 to 12.

The image processor 200 may perform image processing on the first to third image data received from the image sensing device 100, and may transfer an image processing result to the image analysis unit 300 or the control unit 400. The image processing may include calculation of a distance to the target object 1 and may improve image quality by performing additional operations (e.g., demosaicing, color tone correction, image quality correction, size adjustment, resolution adjustment, image synthesis, and so on).

The image processor 200 may generate a first or second depth image including distance information on the target object 1, based on the first or second image data of the image sensing device 100 in which the distance information on the target object 1 includes distances between the image sensing device 100 and the target object 1. The first and second depth images may be collectively referred to as a depth image. The image processor 200 may generate an infrared (IR) image including infrared image information on the target object 1, based on the third image data of the image sensing device 100.

The image processor 200 may request the image analysis unit 300 to analyze the first depth image, the second depth image or the IR image generated in the first to third operation modes, respectively, and may receive an image analysis result from the image analysis unit 300. The image analysis result may include a first image analysis result corresponding to a result of analyzing the first depth image, a second image analysis result corresponding to a result of analyzing the second depth image and a third image analysis result corresponding to a result of analyzing the IR image.

The image processor 200 may transition between the operation modes of the image sensing device 100 according to the first or second image analysis result, and may transfer a mode transition result to the control unit 400. A mode transition means a transition between the operation modes.

The image processor 200 may transfer the third image analysis result to the control unit 400.

The image analysis unit 300 may identify an object in an image.

The image analysis unit 300 may determine whether the first depth image satisfies a first mode transition condition. In an embodiment, the first mode transition condition may indicate whether a first object positioned within a first distance range in the first depth image is recognized as a human shape. The first depth image may include depth information (i.e., a distance to the target object 1) in each pixel, and the first object may indicate a set of image sensor pixels which are adjacent to one another and have depth information within the first distance range. The first distance range may be a value that is experimentally determined as a distance range within which a human shape can be accurately identified by the image sensing device 100 having a certain field-of-view (FOV).

The image analysis unit 300 may determine whether the first mode transition condition is satisfied, by identifying the first object and then determining whether the first object is recognized as a human shape.

If the first mode transition condition is satisfied, the image analysis unit 300 may generate the first image analysis result indicating that it has successfully transitioned from one mode to the first mode. If the first mode transition condition is not satisfied, the image analysis unit 300 may generate the first image analysis result indicating that it has failed to transition to the first mode. The image processor 200 may control the image sensing device 100 to operate in the second operation mode if the first image analysis result indicating the mode transition is successful.

The image analysis unit 300 may determine whether the second depth image satisfies a second mode transition condition. In an embodiment, the second mode transition condition may indicate whether a second object positioned within a second distance range in the second depth image is recognized as the shape of a specific body part (e.g., a hand). The second depth image may include depth information (i.e., a distance to the target object 1) in each pixel, and the second object may indicate a set of image sensor pixels which are adjacent to one another and have depth information within the second distance range. The second distance range may be a value that is experimentally determined as a distance range within which a human hand can be accurately identified by the image sensing device 100 having a certain field-of-view (FOV).

The image analysis unit 300 may determine whether the second mode transition condition is satisfied, by identifying the second object and then determining whether the second object corresponds to the shape of the specific body part of a human.

If the second mode transition condition is satisfied, the image analysis unit 300 may generate the second image analysis result indicating that it has successfully transitioned from one mode to the second mode. If the second mode transition condition is not satisfied, the image analysis unit 300 may generate the second image analysis result indicating that it has failed to transition to the second mode. The image processor 200 may control the image sensing device 100 to operate in the third operation mode if the second image analysis result indicating the mode transition is successful.

The image analysis unit 300 may determine a user input corresponding to a third object included in the IR image generated in the third operation mode, and may generate the third image analysis result including information on the corresponding user input. The IR image includes information on the intensity of infrared light in each image sensor pixel. Since the human skin has a relatively high reflectance with respect to infrared light of a certain wavelength range, intensity information of a pixel photographing the human skin may be equal to or greater than a reference value. The third object may indicate a set of image sensor pixels which are adjacent to one another and have intensity information corresponding to at least the reference value. The image analysis unit 300 may identify the third object, and then, may determine a user input corresponding to the third object.

For example, a user input may include at least one among a sign language corresponding to a hand motion or gesture of a human, security key related motion information comparing a motion corresponding to a human motion with a security key motion or gesture, and a game player's input corresponding to a human motion. The image analysis unit 300 may determine a user input based on an infrared (IR) image corresponding to one frame, or may determine a user input based on an IR image corresponding to a plurality of consecutive frames. This is because, in some cases, a user input may be determined only by recognizing continuous human motions.

The image analysis unit 300 may perform the operation of determining whether the first object in the first depth image corresponds to a human shape, the operation of determining whether the second object in the second depth image corresponds to the shape of a specific body part (e.g., a hand) and the operation of determining a user input corresponding to the third object in the IR image, by using an image recognition technology of an artificial intelligence (AI).

As an example, the image analysis unit 300 may use a deep learning algorithm based on a convolutional neural network (CNN). The deep learning algorithm may classify images into various patterns, learn pattern-type data, and determine, when a new image is given, what an object in the image corresponds to (e.g., a human shape, the shape of a hand or a specific gesture).

The control unit 400 may control the general operation of the motion recognition apparatus 10, and may control activation and inactivation of respective components included in the motion recognition apparatus 10. In particular, the control unit 400 may operate a mode of the motion recognition apparatus 10 divisionally as a standby mode or a normal mode in order to reduce the power consumption of the motion recognition apparatus 10. The standby mode may indicate a state in which the remaining components except the proximity sensor 410, the touch screen 420 and/or the microphone 430 in the motion recognition apparatus 10 are inactivated. The normal mode may indicate a state in which the components included in the motion recognition apparatus 10 are activated.

In the case where there is no user input for a predetermined time in the normal mode, the control unit 400 may control the motion recognition apparatus 10 to enter the standby mode. In the case where, in the standby mode, the proximity sensor 410, the touch screen 420 and/or the microphone 430 receives a predetermined wake-up input and transfers it to the control unit 400, the control unit 400 may control the motion recognition apparatus 10 to enter the normal mode. The receiving of the predetermined wake-up input by the proximity sensor 410 may indicate that the proximity sensor 410 senses the target object 1 as the target object 1 is positioned within a predetermined proximity range of the proximity sensor 410. The receiving of the predetermined wake-up input by the touch screen 420 may indicate that a menu (e.g., a start button) displayed on the touch screen 420 is touched by a user. The receiving of the predetermined wake-up input by the microphone 430 may indicate that a specific voice input (e.g., "Start please") is inputted through the microphone 430.

The control unit 400 may receive the wake-up input from the proximity sensor 410, the touch screen 420 and/or the microphone 430, and may transfer a first guide message, corresponding to the wake-up input, to the touch screen 420 and/or the speaker 440. Also, the control unit 400 may receive the first and second image analysis results from the image processor 200, and may transfer second and third guide messages, corresponding to the first and second image analysis results, respectively, to the touch screen 420 and/or the speaker 440.

The proximity sensor 410 may sense whether the target object 1 is positioned within the predetermined proximity range. For example, the proximity sensor 410 may include at least one among a high-frequency oscillation sensor, a capacitive sensor, a magnetic sensor, an inductive sensor and/or an ultrasonic sensor. The proximity sensor 410 may generate proximity information on a result of sensing the target object 1, and may transfer the generated proximity information to the control unit 400.

The touch screen 420 may include a touch panel capable of sensing a user's touch input, and a display panel disposed to overlap with the touch panel and capable of outputting a screen to be provided to the user. In other words, the touch screen 420 may provide a screen which can be seen by the user, and at the same time, may receive a user input to a menu displayed on the screen. The touch screen 420 may output a screen on which a text and/or an image corresponding to each of the first to third guide messages is displayed.

The microphone 430 may generate voice information by converting a voice input from the user into an electrical signal, and may transfer the voice information to the control unit 400.

The speaker 440 may output voice information including a text corresponding to each of the first to third guide messages transferred from the control unit 400 so that the user can hear the voice information.

Figure 2:
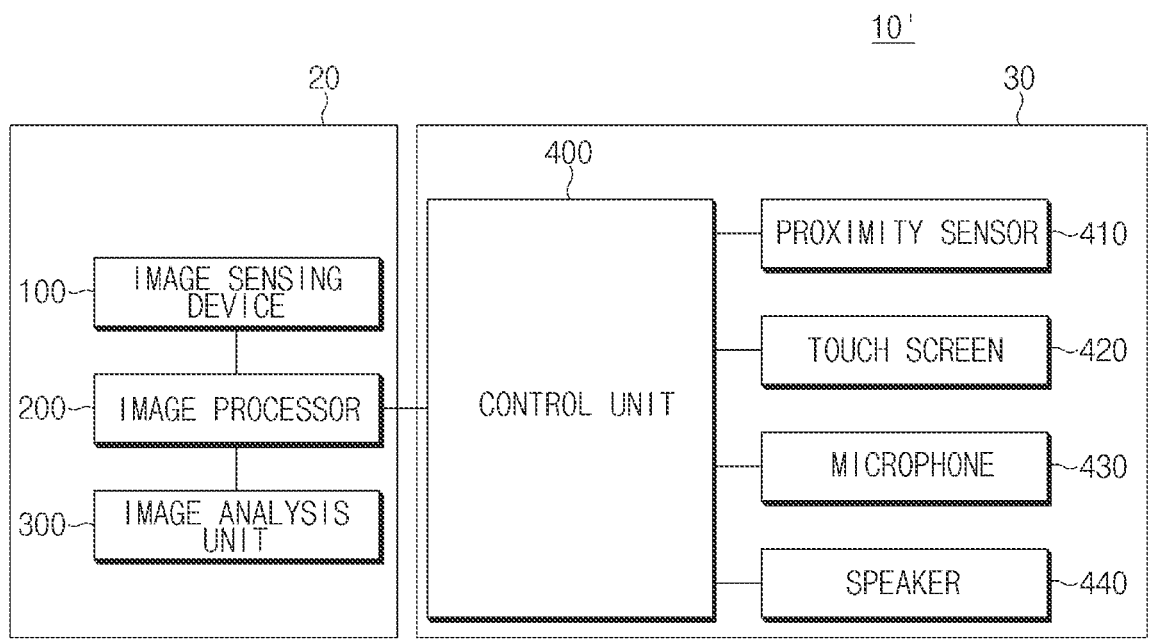
FIG. 2 illustrates an example of a motion recognition apparatus using a ToF sensor based on another embodiment of the disclosed technology.

FIG. 2 illustrates an example of a motion recognition apparatus based on another embodiment of the disclosed technology.

Referring to FIG. 2, a motion recognition apparatus 10' based on another embodiment of the disclosed technology may include an image analysis apparatus 20 and a main control apparatus 30 which are physically independent from each other.

The image analysis apparatus 20 may include an image sensing device 100, an image processor 200 and an image analysis unit 300. The main control apparatus 30 may include a control unit 400, a proximity sensor 410, a touch screen 420, a microphone 430 and a speaker 440. In some implementations, the components 100 to 440 of the motion recognition apparatus 10' are similar or identical to the components 100 to 440 of the motion recognition apparatus 10 described above with reference to FIG. 1.

In some implementations, among the components of the motion recognition apparatus 10 of FIG. 1, the components 100 to 300 related to an image may be included in the image analysis apparatus 20, and the other components 400 to 440 may be included in the main control apparatus 30.

The image analysis apparatus 20 may communicate with the main control apparatus 30 based on a wired/wireless communication standard. For example, the image analysis apparatus 20 may communicate with the main control apparatus 30 based on a wired communication standard such as USB (universal serial bus) and UFS (universal flash storage) and a wireless communication standard such as Wi-Fi and Bluetooth.

In another embodiment of the disclosed technology, as illustrated in FIG. 2, the motion recognition apparatus 10' includes the main control apparatus 30 which does not have image capture and image analysis functions, but can perform all operations of the motion recognition apparatus 10 described above with reference to FIG. 1, by using an external image analysis module (e.g., the image analysis apparatus 20 in FIG. 2).

In another embodiment, the image analysis unit 300 may be included in the main control apparatus 30.

In this patent document, the discussions associated with the motion recognition apparatus 10 may be applied to the motion recognition apparatus 10'.

Figure 3:
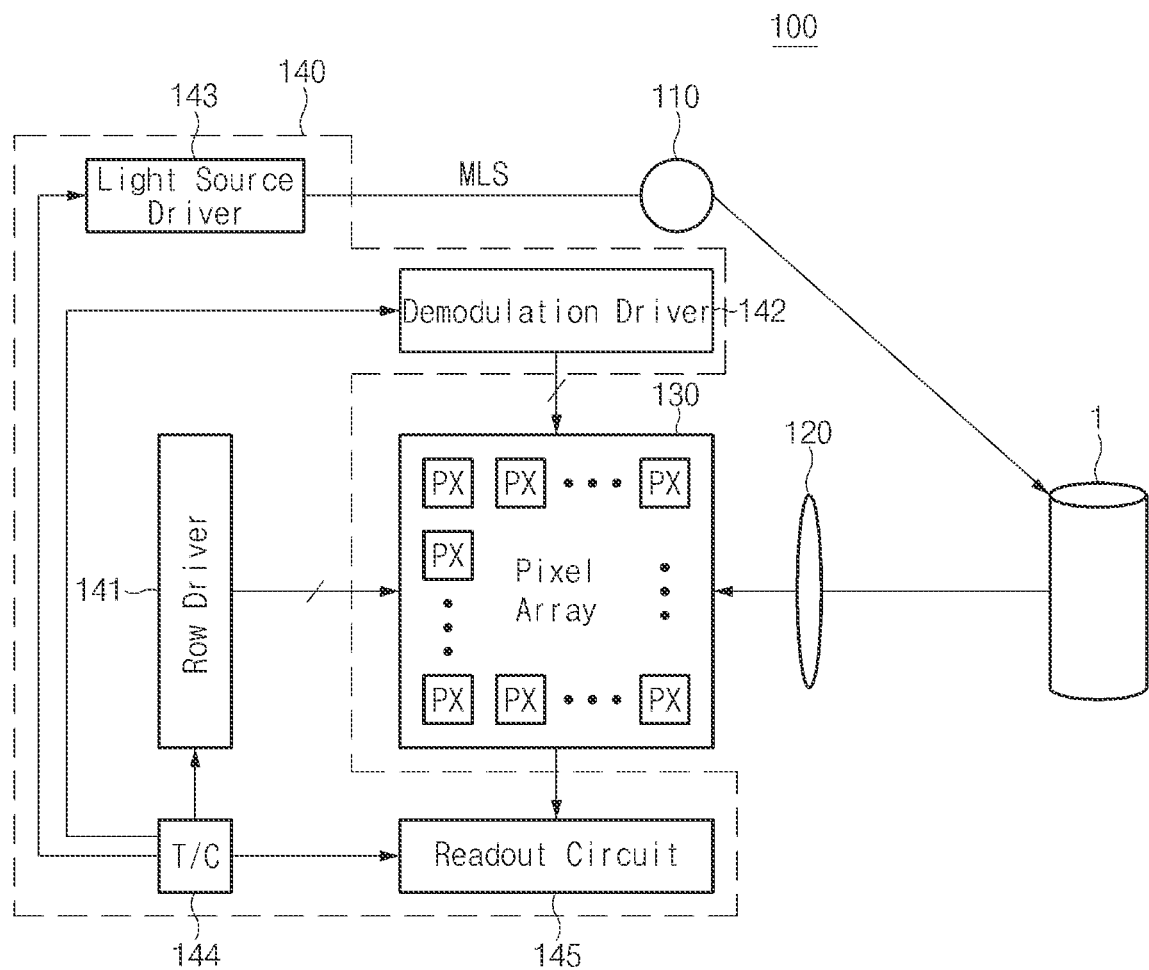
FIG. 3 illustrates an example configuration of an image sensing device based on an embodiment of the disclosed technology.

FIG. 3 illustrates an example configuration of an image sensing device based on an embodiment of the disclosed technology.

Referring to FIG. 3, the image sensing device 100 may measure a distance to the target object 1 by using the time-of-flight (ToF) method or obtain an IR image of the target object 1. Such an image sensing device 100 may include a light source 110, a lens module 120, a pixel array 130, and a control circuit 140.

The light source 110 emits light to the target object 1 in response to a light modulation signal MLS from the control circuit 140. The light source 110 may be a vertical cavity surface emitting laser (VCSEL), a laser diode (LD), a light emitting diode (LED), a near infrared laser (NIR), a point light source, a monochromatic light source in which a white lamp and a monochromator are combined, or a combination of other laser light sources, which emits light of a specific wavelength band (e.g., near infrared light, infrared light or visible light). For example, the light source 110 may emit infrared light having a wavelength of 800 nm to 10,000 nm. The light emitted from the light source 110 may be light that is modulated at a predetermined modulation frequency. While FIG. 3 illustrates only one light source 110 by way of example, it is to be noted that a plurality of light sources may be arranged around the lens module 120.

The lens module 120 may collect light reflected from the target object 1, and may focus the collected light on pixels PX of the pixel array 130. For example, the lens module 120 may include a focusing lens or another cylindrical optical element having a glass or plastic surface. The lens module 120 may include a plurality of lenses which are aligned around an optical axis.

The pixel array 130 may include a plurality of unit pixels PX which are successively arranged in a two-dimensional matrix structure. For example, the plurality of unit pixels PX may be arranged in rows and columns. The unit pixels PX may be formed in a semiconductor substrate. Each unit pixel PX may convert light incident through the lens module 120 into an electrical signal corresponding to the intensity of the light, and thereby, may output a pixel signal. Each unit pixel PX may be a current-assisted photonic demodulator (CAPD) pixel. A detailed structure and operation of each unit pixel PX will be described later with reference to FIGS. 4 to 7.

The control circuit 140 may emit light to the target object 1 by controlling the light source 110, and may generate digital type pixel data through processing pixel signals, corresponding to light reflected from the target object 1, by performing operations associated with the unit pixels PX of the pixel array 130.

The control circuit 140 may include a row driver 141, a demodulation driver 142, a light source driver 143, a timing controller 144, and a readout circuit 145.

The row driver 141 and the demodulation driver 142 may be collectively referred to as a driving circuit.

The driving circuit may drive the unit pixels PX of the pixel array 130 in response to a timing signal outputted from the timing controller 144.

The driving circuit may generate a control signal to select and control at least one row line among a plurality of row lines of the pixel array 130. Such a control signal may include a demodulation control signal for generating a hole current in the substrate, a reset signal for controlling a reset transistor, a transmission signal for controlling transfer of photocharge accumulated in a detection node, a floating diffusion signal for providing additional capacitance under a high luminance condition, and a select signal for controlling a select transistor.

The row driver 141 may generate the reset signal, the transmission signal, the floating diffusion signal and the select signal, and the demodulation driver 142 may generate the demodulation control signal.

The light source driver 143 may generate the light modulation signal MLS to operate the light source 110, under the control of the timing controller 144. The light source driver 143 may vary a modulation frequency of the light modulation signal MLS depending on an operation mode of the image sensing device 100, or may generate the light modulation signal MLS with a constant level.

In the first operation mode, the light source driver 143 may generate the light modulation signal MLS with a first modulation frequency.

In the second operation mode, the light source driver 143 may generate the light modulation signal MLS with a second modulation frequency. The second modulation frequency may be higher than the first modulation frequency.

In the third operation mode, the light source driver 143 may generate the light modulation signal MLS with a constant level.

The timing controller 144 may generate a timing signal for controlling the operations of the row driver 141, the demodulation driver 142, the light source driver 143 and the readout circuit 145, under the control of the image processor 200.

The readout circuit 145 may generate pixel data in the form of digital signals by processing pixel signals outputted from the pixel array 130, under the control of the timing controller 144. To this end, the readout circuit 145 may include a correlated double sampler (CDS) for performing correlated double sampling on the pixel signals outputted from the pixel array 130. The readout circuit 145 may include an analog-digital converter for converting output signals from the correlated double sampler into digital signals. Further, the readout circuit 145 may include a buffer circuit for temporarily storing pixel data outputted from the analog-digital converter and outputting the pixel data to the outside under the control of the timing controller 144. As the pixel array 130 is configured by CAPD pixels, column lines for transferring pixel signals may be provided by two per column of the pixel array 130, and components for processing a pixel signal outputted from each column line may also be provided in correspondence to each column line.

The pixel data generated and outputted by the readout circuit 145 may be differently defined depending on an operation mode of the image sensing device 100. The pixel data generated and outputted by the readout circuit 145 may be defined as the first to third image data in the first to third operation modes, respectively.

The light source 110 may emit modulated light which is modulated to a predetermined modulation frequency, toward a scene to be photographed by the image sensing device 100, and the image sensing device 100 may generate pixel data in each unit pixel PX by sensing modulated light (that is, incident light) reflected from the target object 1 in the scene. There is a time delay between the modulated light and the incident light depending on a distance between the image sensing device 100 and the target object 1. Such a time delay is represented as a phase difference between a signal which is generated by the image sensing device 100 and the light modulation signal MLS which controls the light source 110. The image processor 200 may generate the first or second depth image including depth information in each unit pixel PX by computing a phase difference appearing in the first or second image data outputted from the image sensing device 100.

The light source 110 may emit infrared light which has a constant level, toward a scene to be captured by the image sensing device 100, and the image sensing device 100 may generate pixel data in each unit pixel PX by sensing infrared light (that is, incident light) reflected from the target object 1 in the scene. The image processor 200 may generate an IR image representing an infrared image of the target object 1, based on the third image data outputted from the image sensing device 100.

In another embodiment, the image sensing device 100 may further obtain a color image of the target object 1. Such an image sensing device 100 may include, in the pixel array 130, color pixels each including a color filter which selectively transmits light corresponding to a specific visible light wavelength. Alternatively, the image sensing device 100 may include a color pixel array configured by color pixels, independently from the pixel array 130, and may separately include a control circuit for performing image sensing operations of the color pixel array, processing pixel signals outputted from the color pixel array and transferring pixel data to the image processor 200.

Figure 4:
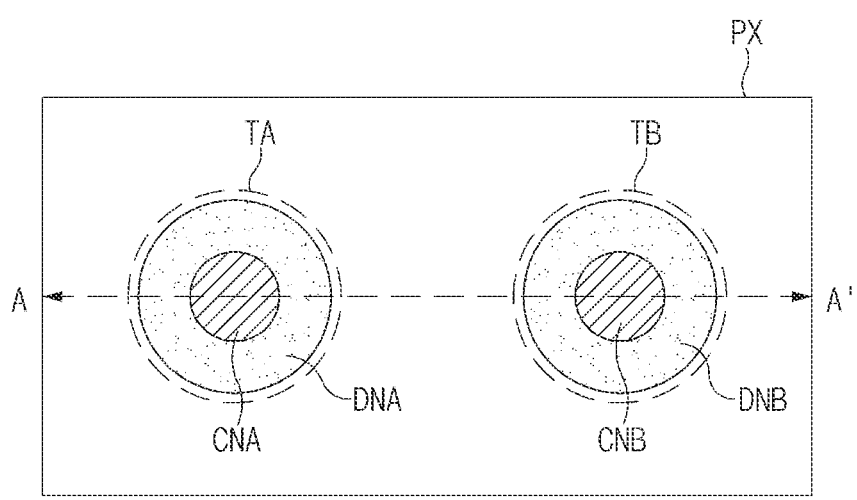
FIG. 4 illustrates an example layout of a pixel illustrated in FIG. 3.

FIG. 4 illustrates an example layout of a pixel illustrated in FIG. 3.

Referring to FIG. 4, the pixel PX may be any one of the pixels PX illustrated in FIG. 3. For the sake of convenience in explanation, description will be made by taking one pixel PX as an example, but it is to be noted that substantially the same structure and operation may be applied to any pixel included in the pixel array 130.

The pixel PX may include a first electrical contact as a tap TA and a second electrical contact as a tap TB. In the present disclosed technology, it is described as an example that two taps TA and TB are included in one pixel PX, but the scope of the disclosed technology is not limited thereto. In other words, three or more taps may be included in one pixel PX. In this case, a plurality of taps may be applied with demodulation control signals of the same or different types (or timings).

The first tap TA and the second tap TB are illustrated as being arranged in a horizontal direction. However, in another embodiment, the first tap TA and the second tap TB may be disposed in a vertical direction or an oblique direction.

The first tap TA may include a first control node CNA and a first detection node DNA which surrounds the first control node CNA. FIG. 4 illustrates that the first control node CNA has a circular shape and the first detection node DNA has a ring shape, but the scope of the disclosed technology is not limited thereto. The ring shape of the first detection node DNA is to surround the first control node CNA through as wide an area as possible. The first detection node DNA having this shape may more easily capture a signal carrier moving along the hole current which is formed by the first control node CNA.

As the first control node CNA and the first detection node DNA are disposed to be in contact with each other, they may be physically separated using only junction isolation through reverse doping.

In another embodiment, the first control node CNA and the first detection node DNA may be disposed to be spaced apart from each other by a predetermined distance. In this case, the first control node CNA and the first detection node DNA may be physically separated from each other by a dielectric layer which is formed by gap-filling a dielectric material in a trench formed by a shallow trench isolation (STI) process.

The second tap TB may include a second control node CNB and a second detection node DNB which surrounds the second control node CNB. Since the structures of the second control node CNB and the second detection node DNB correspond to the structures of the first control node CNA and the first detection node DNA, repeated description will be omitted.

Figure 5:
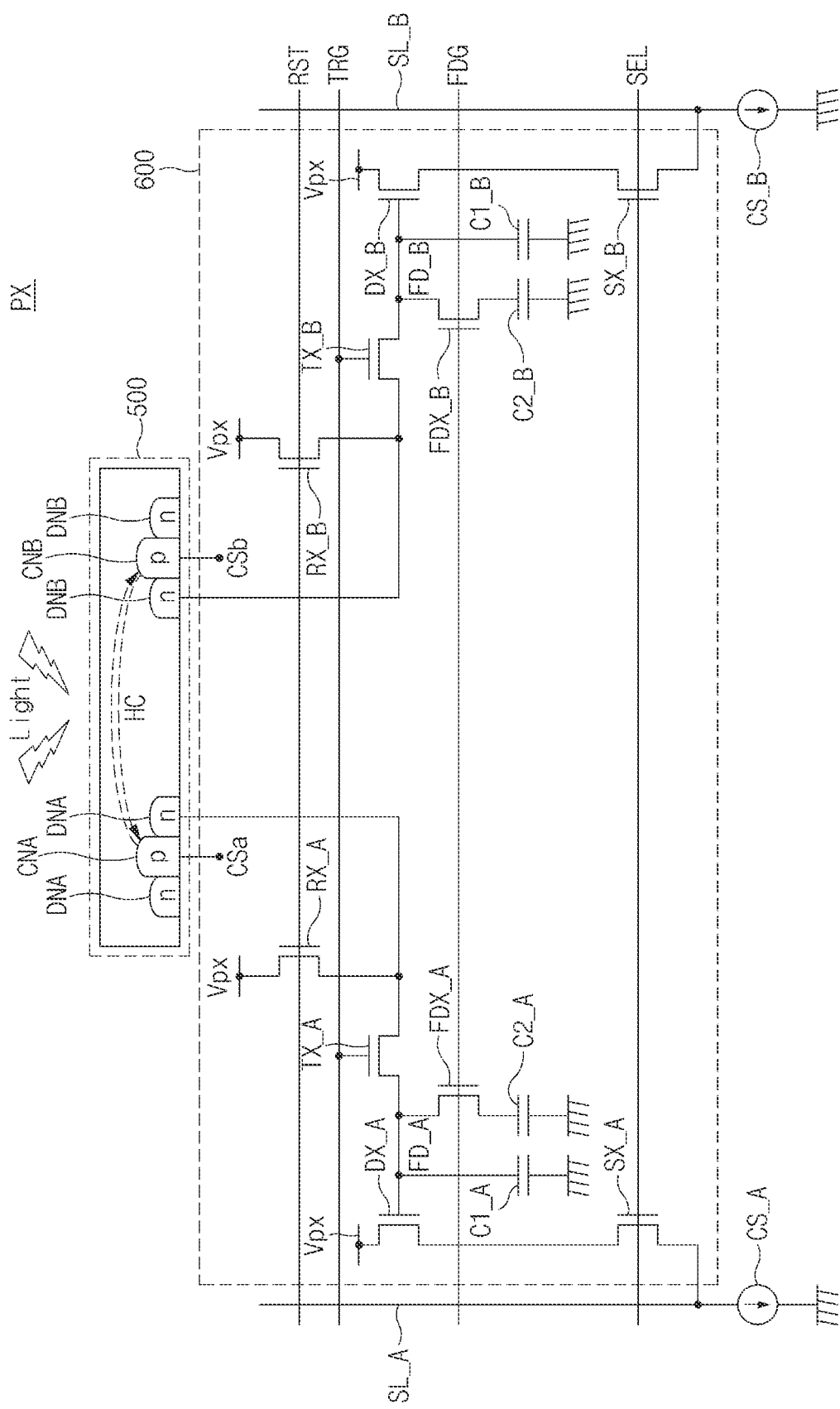
FIG. 5 illustrates an example of the pixel illustrated in FIG. 4.

In FIG. 5, the structure and operation of the pixel PX will be described with reference to, as an example, a cross-section of the pixel PX taken along a line A-A' of FIG. 4.

FIG. 5 illustrates an example of the pixel illustrated in FIG. 4.

Referring to FIG. 5, the pixel PX may include, among other things, a photoelectric conversion region 500 and a circuit region 600.

The photoelectric conversion region 500 corresponds to a region briefly illustrating a cross-section of the pixel PX taken along the line A-A' of FIG. 4. Although not illustrated, an infrared filter capable of selectively transmitting light corresponding to an infrared light wavelength range among incident light may be disposed on the top surface of the photoelectric conversion region 500.

The photoelectric conversion region 500 may include the first and second control nodes CNA and CNB and the first and second detection nodes DNA and DNB. The first control node CNA and the first detection node DNA may configure a first tap (or a first demodulation node), and the second control node CNB and the second detection node DNB may configure a second tap (or a second demodulation node).

The first and second control nodes CNA and CNB and the first and second detection nodes DNA and DNB may be formed in the substrate. For example, the substrate may be a P-type semiconductor substrate, the first and second control nodes CNA and CNB may be P-type impurity regions, and the first and second detection nodes DNA and DNB may be N-type impurity regions.

The first and second control nodes CNA and CNB may receive first and second demodulation control signals CSa and CSb, respectively, from the demodulation driver 142. The voltage difference between the first demodulation control signal CSa and the second demodulation control signal CSb generates a hole current HC which controls the flow of a signal carrier generated in the substrate by incident light. When the voltage of the first demodulation control signal CSa is higher than the voltage of the second demodulation control signal CSb, the hole current HC flows from the first control node CNA to the second control node CNB. When the voltage of the first demodulation control signal CSa is lower than the voltage of the second demodulation control signal CSb, the hole current HC flows from the second control node CNB to the first control node CNA.

Each of the first and second detection nodes DNA and DNB may perform a function of capturing and accumulating a signal carrier moving according to the flow of the hole current HC.

In an embodiment, the first and second control nodes CNA and CNB may include P-type impurity regions with different doping concentrations. For example, a P-type impurity region (a P− region) with a relatively low doping concentration may be implanted into the substrate, and a P-type impurity region (a P+ region) with a relatively high doping concentration may be implanted into the substrate at the same position to have a depth smaller than that of the P− region. The first and second detection nodes DNA and DNB may include N-type impurity regions with different doping concentrations. For example, an N-type impurity region (an N− region) with a relatively low doping concentration may be implanted into the substrate, and an N-type impurity region (an N+ region) with a relatively high doping concentration may be implanted into the substrate at the same position to have a depth smaller than that of the N− region.

A depth of the P− region may be larger than a depth of the N− region. This is to reduce a length of the path of the hole current HC, thereby facilitating the flow of the hole current HC.

In the first or second operation mode, photocharge capture of the photoelectric conversion region 500 may be performed over a first period and a second period as sequential time periods.

In the first period, incident light incident into the pixel PX may be photoelectrically converted according to a photoelectric effect, thereby generating pairs of electrons and holes corresponding to the intensity of the incident light. In the present disclosed technology, electrons generated in correspondence to the intensity of incident light may indicate photocharge. The demodulation driver 142 may apply the first demodulation control signal CSa to the first control node CNA, and may apply the second demodulation control signal CSb to the second control node CNB. A voltage of the first demodulation control signal CSa may be higher than a voltage of the second demodulation control signal CSb. The voltage of the first demodulation control signal CSa may be defined as an active voltage, and the voltage of the second demodulation control signal CSb may be defined as an inactive voltage. For example, the voltage of the first demodulation control signal CSa may be 1.2V, and the voltage of the second demodulation control signal CSb may be 0V.

An electric field may be generated between the first control node CNA and the second control node CNB due to a voltage difference between the voltage of the first demodulation control signal CSa and the voltage of the second demodulation control signal CSb, and the hole current HC may flow from the first control node CNA to the second control node CNB. Holes in the substrate move in the direction of the second control node CNB, and electrons in the substrate move in the direction of the first control node CNA.

Electrons are generated in the substrate in correspondence to the luminous intensity of incident light, and the generated electrons may move in the direction of the first control node CNA and be captured by the first detection node DNA which is adjacent to the first control node CNA. Therefore, electrons in the substrate may be used as a signal carrier for detecting the luminous intensity of the incident light.

In the second period successive to the first period, incident light incident into the pixel PX may be photoelectrically converted according to a photoelectric effect, thereby generating pairs of electrons and holes corresponding to the intensity of the incident light. The demodulation driver 142 may apply the first demodulation control signal CSa to the first control node CNA, and may apply the second demodulation control signal CSb to the second control node CNB. A voltage of the first demodulation control signal CSa may be lower than a voltage of the second demodulation control signal CSb. The voltage of the first demodulation control signal CSa may be defined as an inactive voltage, and the voltage of the second demodulation control signal CSb may be defined as an active voltage. For example, the voltage of the first demodulation control signal CSa may be 0V, and the voltage of the second demodulation control signal CSb may be 1.2V.

An electric field may be generated between the first control node CNA and the second control node CNB due to a voltage difference between the voltage of the first demodulation control signal CSa and the voltage of the second demodulation control signal CSb, and the hole current HC may flow from the second control node CNB to the first control node CNA. Holes in the substrate move in the direction of the first control node CNA, and electrons in the substrate move in the direction of the second control node CNB.

In other words, electrons are generated in the substrate in correspondence to the luminous intensity of incident light, and the generated electrons may move in the direction of the second control node CNB and be captured by the second detection node DNB which is adjacent to the second control node CNB. Therefore, electrons in the substrate may be used as a signal carrier for detecting the luminous intensity of the incident light.

In another embodiment, the sequence of the first period and the second period may be changed.

In the third operation mode, photocharge capture of the photoelectric conversion region 500 may be performed in a third period being a time period repeated with a predetermined interval. The first and second demodulation control signals CSa and CSb in the third period may be substantially the same as the first and second demodulation control signals CSa and CSb in the first or second period. A voltage of each of the first and second demodulation control signals CSa and CSb in repeated third periods may be constant. Namely, in the first or second operation mode, an active voltage and an inactive voltage may be alternately applied to the first control node CNA and the second control node CNB, respectively, in the first and second periods, whereas, in the third operation mode, an active voltage and an inactive voltage may be fixedly applied to the first control node CNA and the second control node CNB, respectively, in the third period. This is because, in the first or second operation mode, demodulation control signals synchronized with the light modulation signal MLS are applied to the first and second control nodes CNA and CNB such that a phase difference between modulated light and incident light can be computed. On the other hand, this is because, in the third operation mode, it is sufficient that demodulation control signals to generate a hole current for capturing photocharge according to incident light regardless of the light modulation signal MLS are applied to the first and second control nodes CNA and CNB such that an IR image according to the incident light can be obtained.

The circuit region 600 may include a plurality of elements for processing photocharge captured by the first detection node DNA and the second detection node DNB and converting the photocharge into an electrical signal. Control signals RST, TRG, FDG and SEL supplied to the plurality of elements may be supplied from the row driver 141. A pixel voltage Vpx may be a power voltage VDD.

First, elements for processing photocharge captured by the first detection node DNA will be described. The circuit region 600 may include a reset transistor RX_A, a transmission transistor TX_A, a first capacitor C1_A, a second capacitor C2_A, a floating diffusion transistor FDX_A, a drive transistor DX_A and a select transistor SX_A.

The reset transistor RX_A may be activated in response to a logic high of a reset signal RST supplied to a gate electrode thereof, and thereby, may reset the voltage of a floating diffusion node FD_A and the first detection node DNA to a predetermined level (i.e., the pixel voltage Vpx). When the reset transistor RX_A is activated, the transmission transistor TX_A may also be simultaneously activated to reset the floating diffusion node FD_A.

The transmission transistor TX_A may be activated in response to a logic high of a transmission signal TRG supplied to a gate electrode thereof, and thereby, may transmit charge, accumulated in the first detection node DNA, to the floating diffusion node FD_A.

The first capacitor C1_A may be coupled to the floating diffusion node FD_A, and may provide predetermined capacitance.

The second capacitor C2_A may be selectively coupled to the floating diffusion node FD_A depending on the operation of the floating diffusion transistor FDX_A, and may provide additional predetermined capacitance.

For example, each of the first capacitor C1_A and the second capacitor C2_A may be configured by at least one of a MIM (Metal-Insulator-Metal) capacitor, a MIP (Metal-Insulator-Polysilicon) capacitor, a MOS (Metal-Oxide-Semiconductor) capacitor and a junction capacitor.

The floating diffusion transistor FDX_A may be activated in response to a logic high of a floating diffusion signal FDG supplied to a gate electrode thereof, and thereby, may couple the second capacitor C2_A to the floating diffusion node FD_A.

For example, under a high luminance condition in which the luminous intensity of incident light is relatively high, the row driver 141 may activate the floating diffusion transistor FDX_A, and thereby, may couple the floating diffusion node FD_A and the second capacitor C2_A. Due to this fact, in the case of a high luminance condition, as the floating diffusion node FD_A may accumulate more photocharge, a high dynamic range may be secured.

Under a low luminance condition in which the luminous intensity of incident light is relatively low, the row driver 141 may inactivate the floating diffusion transistor FDX_A, and thereby, may decouple the floating diffusion node FD_A and the second capacitor C2_A.

In another embodiment, the floating diffusion transistor FDX_A and the second capacitor C2_A may be omitted.

As the drive transistor DX_A has a drain electrode which is coupled to the pixel voltage Vpx and a source electrode which is coupled to a vertical signal line SL_A through the select transistor SX_A, the drive transistor DX_A may configure a source follower circuit with a load MOS of a constant current source circuit section CS_A which is coupled to one end of the vertical signal line SL_A. Namely, the drive transistor DX_A may output current, corresponding to the voltage of the floating diffusion node FD_A coupled to a gate electrode thereof, to the vertical signal line SL_A through the select transistor SX_A.

The select transistor SX_A may be activated in response to a logic high of a select signal SEL supplied to a gate electrode thereof, and thereby, may output a pixel signal, outputted from the drive transistor DX_A, to the vertical signal line SL_A.

In order to process photocharge captured by the second detection node DNB, the circuit region 600 may include a reset transistor RX_B, a transmission transistor TX_B, a first capacitor C1_B, a second capacitor C2_B, a floating diffusion transistor FDX_B, a drive transistor DX_B and a select transistor SX_B. Since the elements for processing the photocharge captured by the second detection node DNB are configured and operated in substantially the same manner as the above-described elements for processing the photocharge captured by the first detection node DNA, except operation timings, repeated description will be omitted.

Pixel signals outputted to the respective vertical signal lines SL_A and SL_B from the circuit region 600 may be converted into image data through noise removal and analog-digital conversion.

FIG. 5 illustrates that each of the reset signal RST, the transmission signal TRG, the floating diffusion signal FDG and the select signal SEL is supplied through one signal line. However, in order to ensure that the elements for processing the photocharge captured by the first detection node DNA and the elements for processing the photocharge captured by the second detection node DNB operate at different timings, each of the reset signal RST, the transmission signal TRG, the floating diffusion signal FDG and the select signal SEL may be supplied through a plurality of signal lines (for example, two signal lines).

In the first or second operation mode, the image processor 200 may calculate a phase difference by computing pixel data obtained from the photocharge captured by the first detection node DNA and pixel data obtained from the photocharge captured by the second detection node DNB, may compute depth information, indicating a distance to the target object 1, from the phase difference corresponding to each pixel, and may generate a depth image including the depth information corresponding to each pixel.

In the third operation mode, the image processor 200 may receive pixel data obtained from photocharge captured by a detection node activated (that is, applied with a demodulation control signal corresponding to an active voltage) between the first detection node DNA and the second detection node DNB, and thereby, may generate an IR image including infrared light intensity information corresponding to each pixel.

Figure 6:
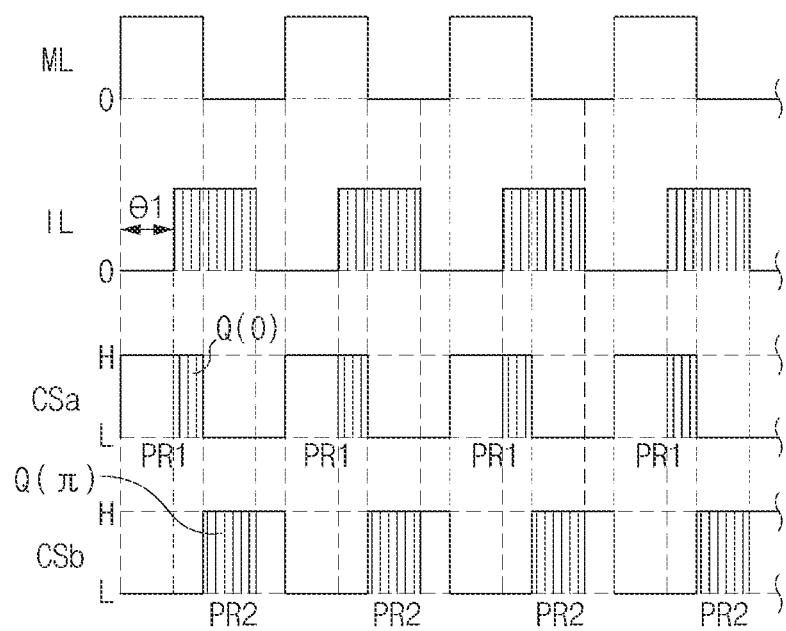
FIG. 6 is a timing diagram showing operations of the image sensing device in a first or second operation mode.

FIG. 6 is a timing showing operations of the image sensing device in a first or second operation mode.

FIG. 6 illustrates examples of modulated light ML, incident light IL, the first demodulation control signal CSa and the second demodulation control signal CSb in the first or second operation mode.

The modulated light ML may indicate light which is emitted to the target object 1 by the light source 110 controlled by the control circuit 140. The modulated light ML may be generated to alternately have a period that has a high level (i.e., a period in which light is emitted) and a period that has a low level (i.e., a period in which light is not emitted). The modulated light ML may be an optical signal which has the first modulation frequency or the second modulation frequency described above.

The incident light IL may indicate light which is incident into the substrate and thereby generates pairs of electrons and holes through a photoelectric effect. The incident light IL may have a phase difference θ1 that varies depending on a distance between the image sensing device 100 and the target object 1.

The level of each of the modulated light ML and the incident light IL may indicate the intensity of light.

While capture of electrons generated by the incident light IL is performed, each of the first demodulation control signal CSa and the second demodulation control signal CSb may alternately have an inactive voltage (a low level: L) and an active voltage (a high level: H). The first demodulation control signal CSa may be a signal which has the same phase as the modulated light ML, and the second demodulation control signal CSb may be a signal which has an opposite phase to (or a phase difference of 180 degrees (n) from) the modulated light ML. Accordingly, each of the first demodulation control signal CSa and the second demodulation control signal CSb may have the same demodulation frequency as the modulation frequency of the modulated light ML. In the first operation mode, the first modulation frequency of the modulated light ML may be the same as the first demodulation frequency of each of the first demodulation control signal CSa and the second demodulation control signal CSb. In the second operation mode, the second modulation frequency of the modulated light ML may be the same as the second demodulation frequency of each of the first demodulation control signal CSa and the second demodulation control signal CSb.

In the disclosed technology, it is assumed that there is no phase difference between the light modulation signal MLS for generating modulated light and the modulated light ML, and thus, the light modulation signal MLS and the modulated light ML may have the same phase.

In a first period PR1, the first demodulation control signal CSa may have an active voltage, and the second demodulation control signal CSb may have an inactive voltage. Accordingly, electrons generated by the incident light IL incident in the first period PR1 may move in the direction of the first control node CNA by the hole current HC, and may be captured by the first detection node DNA. Electrons captured by the first detection node DNA in the first period PR1 may be defined as Q(0).

In a second period PR2, the first demodulation control signal CSa may have an inactive voltage, and the second demodulation control signal CSb may have an active voltage. Accordingly, electrons generated by the incident light IL incident in the second period PR2 may move in the direction of the second control node CNB by the hole current HC, and may be captured by the second detection node DNB. Electrons captured by the second detection node DNB in the second period PR2 may be defined as Q(n).

The electrons generated by the incident light IL having the phase difference θ1 that varies depending on a distance between the image sensing device 100 and the target object 1 may be captured by the first detection node DNA in the first period PR1 or be captured by the second detection node DNB in the second period PR2.

The total charge generated by the incident light IL may be defined as the sum of Q(0) and Q(n). As the phase difference θ1 increases, Q(n) linearly increases, and Q(0) linearly decreases. Therefore, based on a ratio between Q(0) and Q(n), the phase difference θ1 may be calculated. The image processor 200 may obtain depth information based on a relationship between a distance between the image sensing device 100 and the target object 1 and the phase difference θ1.

A modulation frequency of the first operation mode may be lower than a modulation frequency of the second operation mode. Therefore, a frequency (a modulation frequency or a demodulation frequency) of each of the modulated light ML and the first and second demodulation control signals CSa and CSb in the first operation mode may be lower than a frequency of each of the modulated light ML and the first and second demodulation control signals CSa and CSb in the second operation mode.

Figure 7:
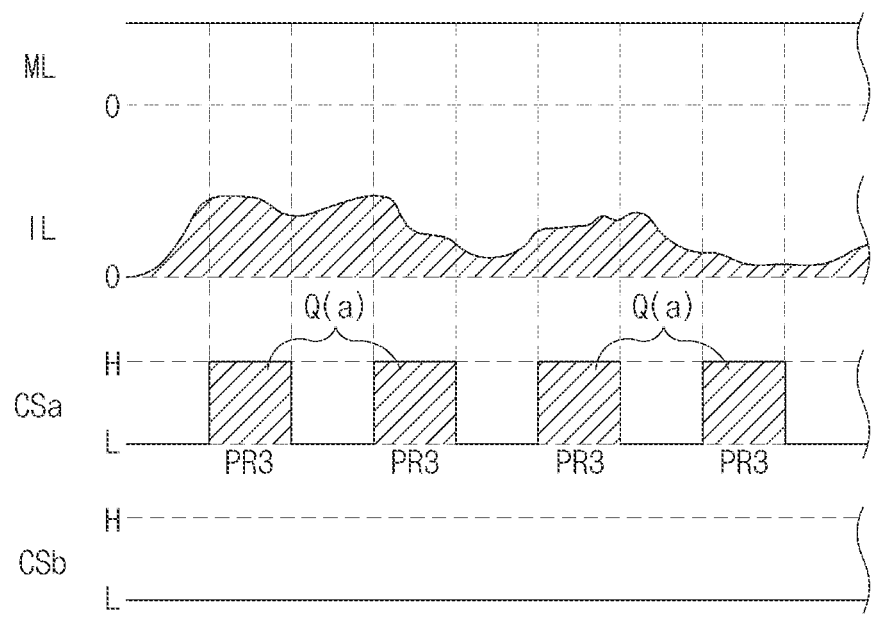
FIG. 7 is a timing diagram showing operations of the image sensing device in a third operation mode.

FIG. 7 is a timing diagram showing operations of the image sensing device in a third operation mode.

FIG. 7 illustrates examples of modulated light ML, incident light IL, the first demodulation control signal CSa and the second demodulation control signal CSb in the third operation mode.

While the pixel array 130 performs photocharge capture, a period in which the modulated light ML has a high level (i.e., a period in which light is emitted) may continue. In another embodiment, while the pixel array 130 performs photocharge capture, a period in which the modulated light ML has a low level (i.e., a period in which light is not emitted) may continue. This is because infrared light is sufficiently present in a scene and thus it is possible to obtain an IR image without modulated light ML. In this case, as the light source 110 is turned off, power consumption may be reduced. Whether to emit the modulated light ML may be controlled by the image processor 200. The image processor 200 may not emit the modulated light ML in the case where a rate of saturated pixel data in the third image data is relatively high, and may emit the modulated light ML in the case where a rate of saturated pixel data in the third image data is relatively low.

The incident light IL may not be a modulated signal which has a phase difference that varies depending on a distance between the image sensing device 100 and the target object 1, but may be infrared light with any level, which is reflected by the target object 1 and is incident into the substrate.

In a third period PR3, the first demodulation control signal CSa may have an active voltage, and the second demodulation control signal CSb may have an inactive voltage. Accordingly, electrons generated by the incident light IL incident in the third period PR3 may move in the direction of the first control node CNA by the hole current HC, and may be captured by the first detection node DNA. In the third period PR3, electrons captured by the first detection node DNA may be defined as Q(a).

In a period from after the third period PR3 to before the next third period PR3 starts, each of the first demodulation control signal CSa and the second demodulation control signal CSb may have an inactive voltage, and the control circuit 140 may generate pixel data corresponding to Q(a) as electrons captured by the first detection node DNA.

In other words, the second demodulation control signal CSb may maintain an inactive voltage, and the first demodulation control signal CSa may have an active voltage in a period (i.e., the third period) in which photocharge generated by the incident light IL is captured and may have an inactive voltage in a period other than the third period.

In another embodiment, the first demodulation control signal CSa may maintain an inactive voltage, and the second demodulation control signal CSb may have an active voltage in a period (i.e., the third period) in which photocharge generated by the incident light IL is captured and may have an inactive voltage in a period other than the third period.

A time from a point of time at which a specific period (e.g., each of the periods PR1 to PR3) starts to a point of time at which a next specific period starts may be defined as a frame time during which image data corresponding to one frame is generated. A frame time in the first and second operation modes may be longer than a frame time in the third operation mode. This is because in the third operation mode, it is necessary to sense continuous human motions and, thus, in order to accurately sense a human motion, it is advantageous to minimize an afterimage or an image lagging phenomenon through a relatively short frame time.

The reason why the third operation mode is possible with such a relatively short frame time is that the IR image may be generated in each pixel without calculating a distance to the target object 1.

The image processor 200 may receive the pixel data obtained from the photocharge Q(a) captured by the first detection node DNA, and thereby, may generate an IR image including infrared light intensity information corresponding to each pixel. In the example of FIG. 7, an infrared light intensity corresponding to the photocharge Q(a) captured in a third period PR3 may be larger than an infrared light intensity corresponding to the photocharge Q(a) captured in a fourth third period PR3.

Figure 8:
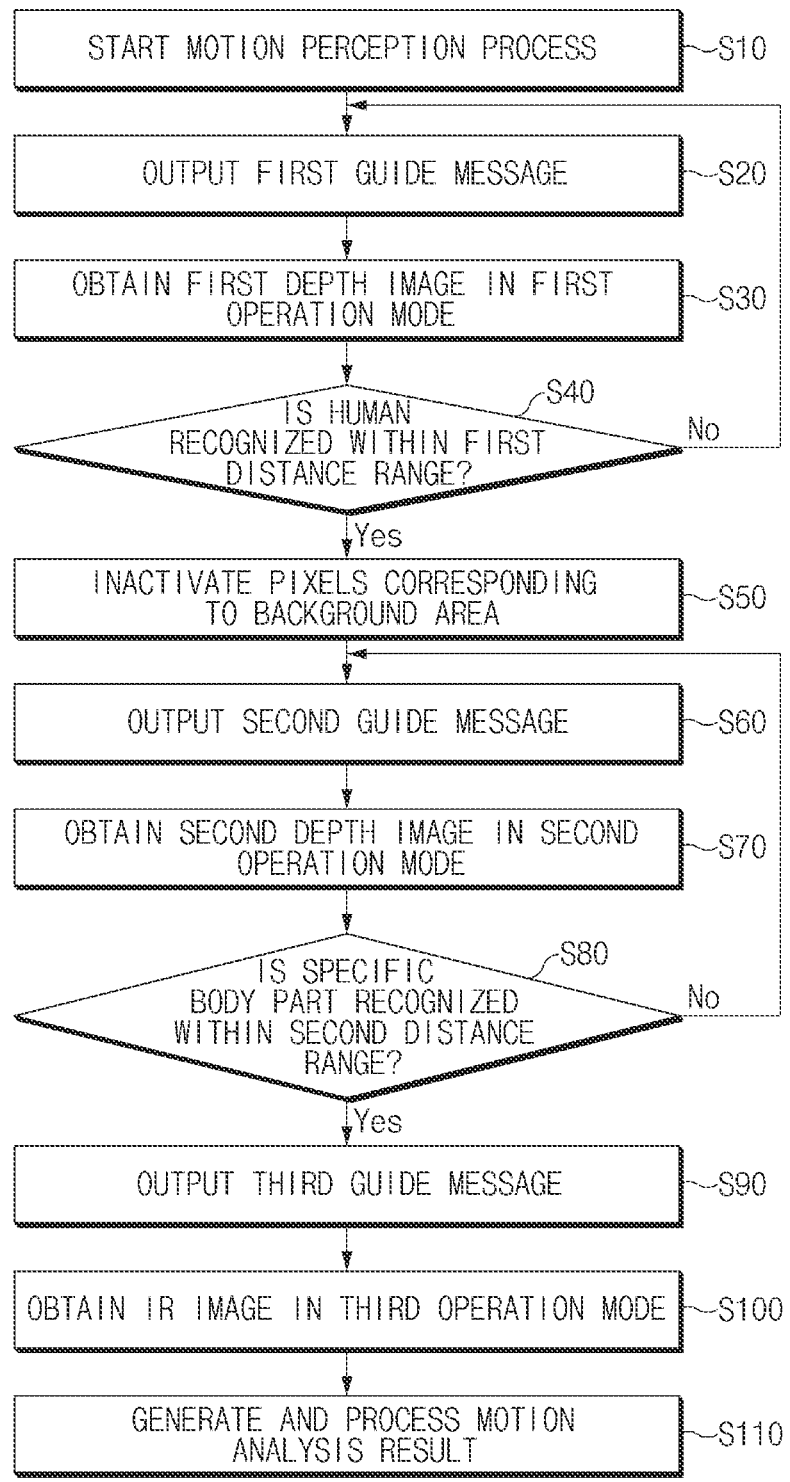
FIG. 8 is a flow chart illustrating example operations of a motion recognition apparatus using a ToF sensor based on an embodiment of the disclosed technology.
Figure 9:
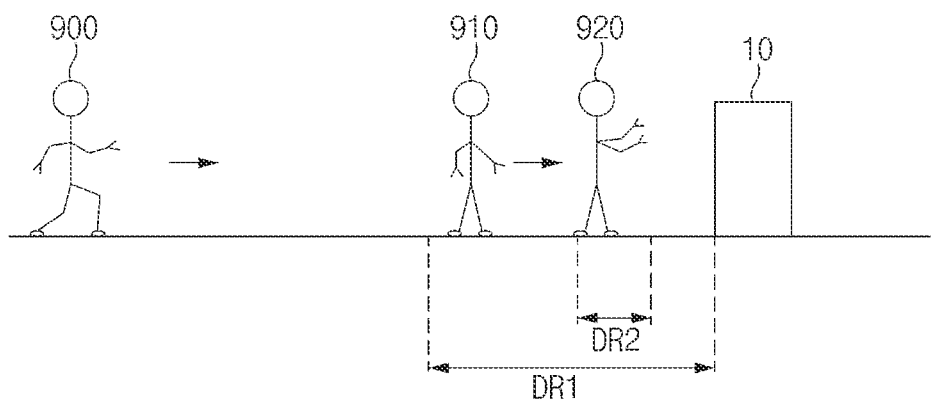
FIG. 9 illustrates how to use the motion recognition apparatus including a ToF sensor.
Figure 10:
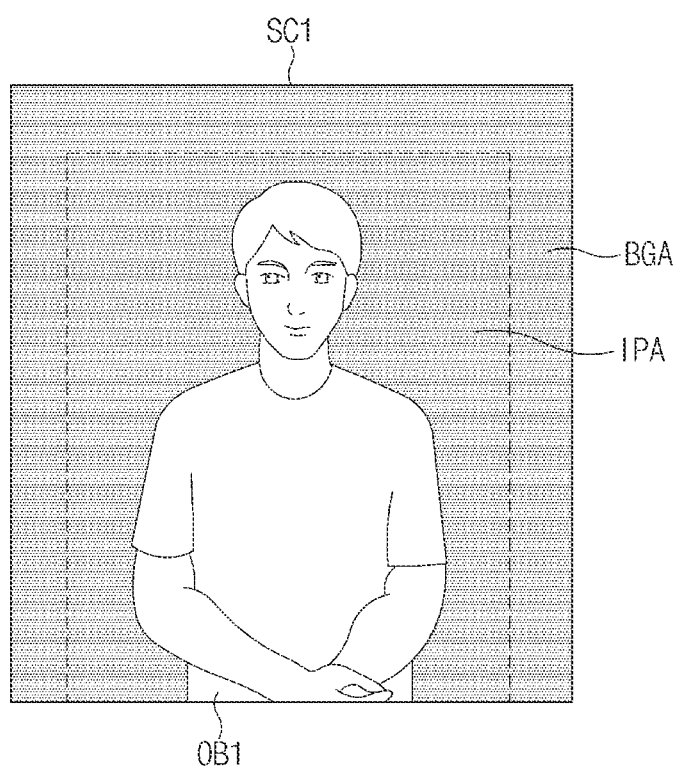
FIG. 10 illustrates an example of a first depth image obtained in the first operation mode.
Figure 11:
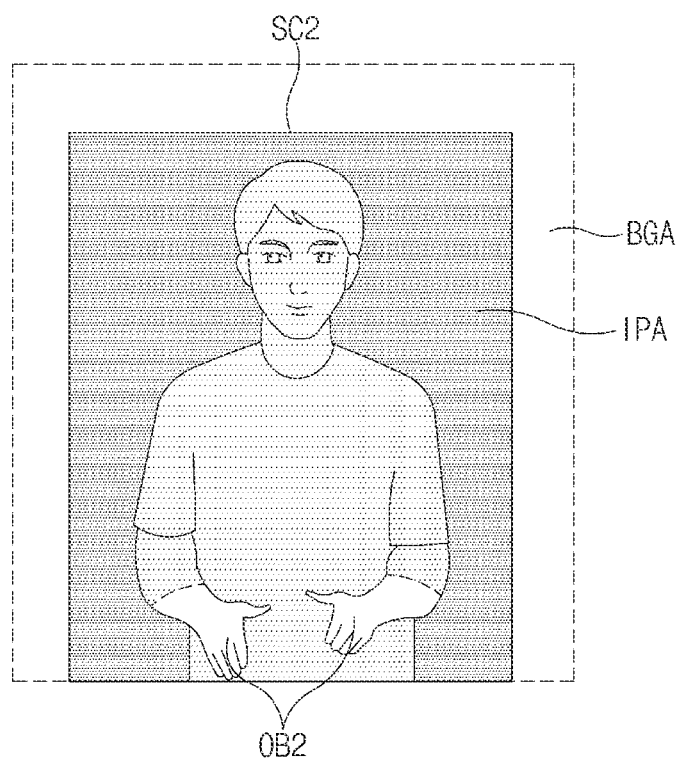
FIG. 11 illustrates an example of a second depth image obtained in the second operation mode.
Figure 12:
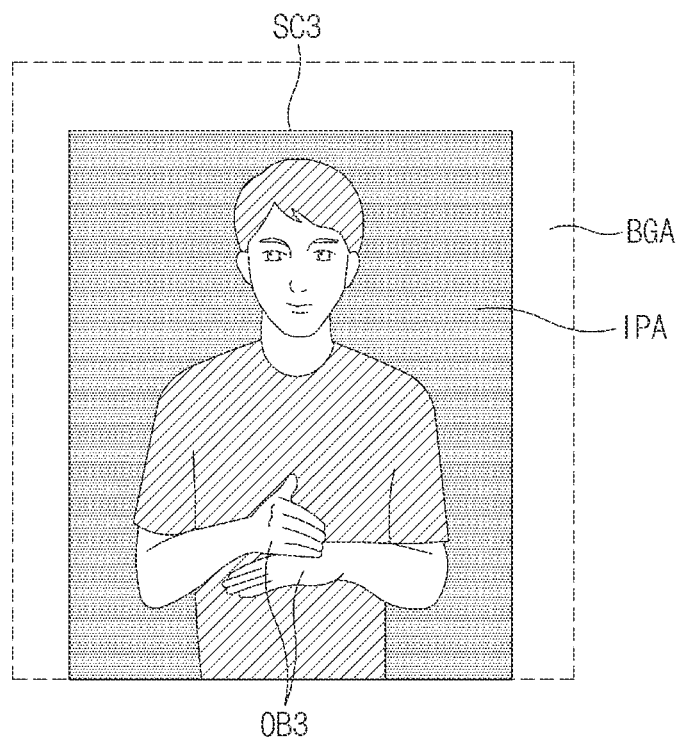
FIG. 12 illustrates an example of an IR image obtained in the third operation mode.

FIG. 8 is a flow chart illustrating example operations of a motion recognition apparatus using a ToF sensor based on an embodiment of the disclosed technology. FIG. 9 illustrates how to use the motion recognition apparatus. FIG. 10 illustrates an example of a first depth image obtained in the first operation mode. FIG. 11 illustrates an example of a second depth image obtained in the second operation mode. FIG. 12 illustrates an example of an IR image obtained in the third operation mode.

Referring to FIGS. 8 to 12, the method for operating a motion recognition apparatus based on some embodiments of the disclosed technology may include, among other things, generating a depth image including distance information on a target object, generating an IR image, including infrared image information on the target object, according to a result of analyzing the depth image, and recognizing a motion based on the IR image. Hereinafter, detailed steps of the method for operating a motion recognition apparatus will be described.

In the embodiment of the disclosed technology to be described with reference to FIGS. 8 to 12, a process in which the motion recognition apparatus 10 senses and processes a motion by human hands will be described, but the scope of the disclosed technology is not limited thereto. Substantially the same technical idea may be applied to sensing and processing of a motion using a specific human body part (e.g., a face, legs or a torso).

In the case where, in the standby mode, the proximity sensor 410, the touch screen 420 and/or the microphone 430 receives a predetermined wake-up input and transfers it to the control unit 400, the control unit 400 may start a motion perception process by controlling the motion recognition apparatus 10 to enter the normal mode (S10). The motion perception process may indicate a series of operations for recognizing a motion of a human and performing a processing corresponding to the recognized motion.

For example, when a human 900 approaching from a long distance to use the motion recognition apparatus 10 enters within the proximity range of the proximity sensor 410 as illustrated in FIG. 9, the control unit 400 may control the motion recognition apparatus 10 to enter the normal mode by receiving a wake-up input from the proximity sensor 410.

The control unit 400 may transfer a first guide message, corresponding to the wake-up input, to the touch screen 420 and/or the speaker 440, and the touch screen 420 and/or the speaker 440 may visually and/or audibly output the first guide message (S20). For example, the first guide message may be "Nice to meet you. Please come closer to the recognition apparatus."

The control unit 400 may activate the image processor 200, and may request the image processor 200 a first image analysis result. The image processor 200 may activate the image sensing device 100 according to the request for the first image analysis result, and may control the image sensing device 100 to operate in the first operation mode.

The image sensing device 100 may obtain first image data by operating in the first operation mode (S30). The first operation mode may indicate a mode in which the light modulation signal MLS with a first modulation frequency is generated, photocharge is captured according to first and second demodulation control signals alternately having an active voltage and an inactive voltage according to a first demodulation frequency the same as the first modulation frequency and having opposite phases, and first image data as a set of pixel data corresponding to the captured photocharge is generated.

The image processor 200 may generate a first depth image, indicating the distance to the target object 1, based on the first image data, and may request the image analysis unit 300 to analyze the first depth image.

The image analysis unit 300 may determine whether the first depth image satisfies a first mode transition condition (S40). In an embodiment, the first mode transition condition may indicate whether a first object positioned within a first distance range in the first depth image corresponds to a human shape.

For example, the steps S20 to S40 may be repeatedly performed until a human 910 is positioned within a first distance range DR1 (e.g., 0 to 2 m) as illustrated in FIG. 9.

FIG. 10 illustrates an example of a first depth image SC1 which is analyzed at the step S40. The first depth image SC1 may include depth information indicating a distance to the target object in each pixel. In FIG. 10, for the sake of convenience in explanation, it is assumed that the contrast of the first depth image SC1 varies depending on a distance to the target object. Namely, in the first depth image SC1, a human at a relatively close distance may be displayed brightly, and a background at a relatively far distance may be displayed darkly.

The image analysis unit 300 may determine whether the first mode transition condition is satisfied, by identifying a first object OB1 as a set of pixels which are adjacent to one another and have depth information within the first distance range DR1 and then determining whether the first object OB1 corresponds to a human shape.

If the first mode transition condition is not satisfied (No of S40), the image analysis unit 300 may generate the first image analysis result indicating a 'transition failure' and transfer it to the image processor 200, and the steps S20 to S40 may be performed again.

If the first mode transition condition is satisfied (Yes of S40), the image analysis unit 300 may generate the first image analysis result indicating the mode transition is successful and transfer it to the image processor 200.

The first image analysis result may include a pixel range (e.g., 100 to 800 rows and 200 to 600 columns) in which the first object OB1 is included, and the image processor 200 may determine an effective pixel range based on the pixel range in which the first object OB1 is included. The effective pixel range may be a pixel range including the pixel range in which the first object OB1 is included and further including a predetermined pixel margin in a row direction and a column direction (e.g., 300 pixels in the row direction and 200 pixels in the column direction). Such a pixel margin may be experimentally determined in consideration of a general human motion.

In FIG. 10, an area corresponding to the effective pixel range in the first depth image SC1 is defined as an image pickup area IPA, and an area other than the effective pixel range is defined as a background area BGA.

The image processor 200 may control the image sensing device 100 to activate only pixels corresponding to the image pickup area IPA and inactivate pixels corresponding to the background area BGA (S50). Activating pixels may indicate applying a control signal to operate the pixels and generating pixel data by processing a pixel signal outputted from the pixels. Conversely, inactivating pixels may indicate a control signal for operating the pixels is not applied or pixel data is not generated since no pixel signal is outputted from the pixels. In another embodiment, inactivating pixels may indicate simultaneously performing operations of pixels by the unit of a predetermined range (e.g., 2×4) of pixels and generating one pixel signal by the predetermined range of pixels (i.e., operating pixels in a binning mode).

By activating only pixels corresponding to the image pickup area IPA requiring image analysis, power consumed by the image sensing device 100 may be reduced.

The image processor 200 may transfer the first image analysis result, indicating the mode transition is successful, to the control unit 400. The control unit 400 may transfer a second guide message, corresponding to the first image analysis result, to the touch screen 420 and/or the speaker 440, and the touch screen 420 and/or the speaker 440 may visually and/or audibly output the second guide message (S60). For example, the second guide message may be "Extend your hand forward so that your hand can be recognized."

The control unit 400 may request the image processor 200 a second image analysis result. The image processor 200 may control the image sensing device 100 to operate in the second operation mode, according to the request for the second image analysis result.

The image sensing device 100 may obtain second image data by operating in the second operation mode (S70). The second operation mode may indicate a mode in which the light modulation signal MLS with a second modulation frequency is generated, photocharge is captured according to first and second demodulation control signals alternately having an active voltage and an inactive voltage according to a second demodulation frequency the same as the second modulation frequency and having opposite phases, and second image data as a set of pixel data corresponding to the captured photocharge is generated.

The second modulation frequency (e.g., 100 MHz) may be higher than the first modulation frequency (e.g., 20 MHz). This is because, as a modulation frequency is high, a distance range that may be accurately sensed by the image sensing device 100 is close to the image sensing device 100. In other words, a relatively low first modulation frequency may be used to sense an overall human shape, and a relatively high second modulation frequency may be used to sense the shape of a human hand extended forward.

The image processor 200 may generate a second depth image, indicating the distance to the target object 1, based on the second image data, and may request the image analysis unit 300 to analyze the second depth image.

The image analysis unit 300 may determine whether the second depth image satisfies a second mode transition condition (S80). In an embodiment, the second mode transition condition may indicate whether a second object positioned within a second distance range in the second depth image corresponds to the shape of a specific body part.

For example, as illustrated in FIG. 10, the steps S60 to S80 may be repeatedly performed until a hand of a human 920 is positioned within a second distance range DR2 (e.g., 0.3 to 1 m).

FIG. 11 illustrates an example of a second depth image SC2 which is analyzed at the step S80. The second depth image SC2 may include depth information indicating a distance to the target object for each pixel. The second depth image SC2 may not include the background area BGA corresponding to the pixels inactivated at the step S50, and may include the image pickup area IPA corresponding to activated pixels.

In FIG. 11, for the sake of convenience in explanation, it is assumed that the contrast of the second depth image SC2 varies depending on a distance to the target object. Namely, in the second depth image SC2, the hands at a relatively closest distance may be displayed most brightly, the face and the torso of a human at a relatively far distance may be displayed more darkly than the hands, and the background at a relatively farthest distance may be displayed more darkly than the face and the torso.

The image analysis unit 300 may determine whether the second mode transition condition is satisfied, by identifying a second object OB2 as a set of pixels which are adjacent to one another and have depth information within the second distance range DR2 and then determining whether the second object OB2 corresponds to the shape of a specific body part (e.g., a hand).

If the second mode transition condition is not satisfied (No of S80), the image analysis unit 300 may generate the second image analysis result indicating a 'transition failure' and transfer it to the image processor 200, and the steps S60 to S80 may be performed again.

If the second mode transition condition is satisfied (Yes of S80), the image analysis unit 300 may generate the second image analysis result indicating the mode transition is successful and transfer it to the image processor 200.

The image processor 200 may transfer the second image analysis result, indicating the mode transition is successful, to the control unit 400. The control unit 400 may transfer a third guide message, corresponding to the second image analysis result, to the touch screen 420 and/or the speaker 440, and the touch screen 420 and/or the speaker 440 may visually and/or audibly output the third guide message (S90). For example, the third guide message may be "Please execute a desired motion."

The control unit 400 may request the image processor 200 a third image analysis result. The image processor 200 may control the image sensing device 100 to operate in the third operation mode, according to the request for the third image analysis result.

The image sensing device 100 may obtain third image data by operating in the third operation mode (S100). The third operation mode may indicate a mode in which the light modulation signal MLS with a constant level is generated, photocharge is captured according to the first demodulation control signal alternately having an active voltage and an inactive voltage and the second demodulation control signal having an inactive voltage, and third image data as a set of pixel data corresponding to the captured photocharge is generated.

The image processor 200 may generate an IR image, representing an infrared image of the target object, based on the third image data, and may request the image analysis unit 300 to analyze the IR image.

The image analysis unit 300 may determine a user input corresponding to a third object included in the IR image, and may generate the third image analysis result including information on the corresponding user input (S110).

FIG. 12 illustrates an example of an IR image SC3 which is analyzed at the step S110. The IR image SC3 may include information on the intensity of infrared light for each pixel. Since the human skin has a relatively high reflectance for infrared light as compared to an object with a temperature lower than a body temperature of a human, intensity information of a pixel photographing the human skin may be equal to or greater than a reference value. Therefore, the hands, the arms and the face corresponding to the human skin may correspond to a third object OB3. The IR image SC3 may not include the background area BGA corresponding to the pixels inactivated at the step S50, and may include the image pickup area IPA corresponding to activated pixels.

In FIG. 12, for the sake of convenience in explanation, it is assumed that the contrast of the IR image SC3 varies depending on intensity information of infrared light. In other words, in the IR image SC3, the third object OB3 corresponding to the human skin may be displayed most brightly, clothes with a relatively low temperature may be displayed more darkly than the hands, and the background with a relatively lowest temperature may be displayed more darkly than the clothes.

In another embodiment, the image analysis unit 300 may receive color information, corresponding to the third object OB3, from the image processor 200, and may combine it with the IR image SC3. This is because, as described above with reference to FIG. 1, the image processor 200 may generate a color image by receiving fourth image data from the image sensing device 100. In this case, the image analysis unit 300 may obtain information on the contrast, saturation and color of the third object OB3, and thus, may more accurately generate a user input corresponding to the third object OB3.

The image analysis unit 300 may identify the third object OB3, may determine a user input corresponding to the third object OB3 using an image recognition technology of an artificial intelligence (e.g., a CNN-based deep learning algorithm), and may generate the third image analysis result. The third image analysis result may include the user input corresponding to the third object OB3, and may also be referred to as a motion analysis result.

In the case where the image analysis unit 300 cannot identify the third object OB3 or cannot determine a user input corresponding to the third object OB3, the steps S90 to S110 may be performed again under the control of the image processor 200.

The image analysis unit 300 may determine a user input based on an IR image corresponding to one frame, or may determine a user input based on an IR image corresponding to a plurality of consecutive frames.

For example, after the IR image SC3 as illustrated in FIG. 12 photographed, when an IR image in which a human's right hand moves up and down is continuously photographed, the image analysis unit 300 may determine a user input corresponding to the third object OB3, as a sign language indicating 'Thank you.'

The image analysis unit 300 may transfer the third image analysis result to the control unit 400 through the image processor 200, and the control unit 400 may process a target operation corresponding to the user input (S110). For example, the control unit 400 may visually and/or audibly output the sign language of 'Thank you' using the touch screen 420 and/or the speaker 440, or may transfer it to another device using a communication module (not illustrated).

In the motion recognition apparatus 10 based on the embodiment of the disclosed technology, by analyzing a depth image, it is possible to move a user to a position where a motion can be recognized, and by analyzing an IR image, it is possible to accurately recognize even a quick motion.

Also, since a motion is recognized using a depth image or an IR image, the motion may be accurately recognized even in environment with very low illumination, even in the case where a user wears clothes having a color similar to a skin color or even without separate special gloves for recognition.

The exemplary embodiments of the disclosed technology have been described above with reference to the accompanying drawings. Variations and enhancements to the disclosed embodiments and other embodiments may be made based on what is disclosed and illustrated.

What is claimed is:

1. A method for recognizing a motion or gesture of an object, comprising:
    operating an optical sensor device to capture light reflected from the object under illumination by light emitted toward the object;
    generating, by comparing the emitted light to the reflected light, a depth image including distance information indicating a distance between the optical sensor device and the object;
    generating, based on the light reflected from the object, an infrared image including infrared image information associated with the object; and
    determining the motion of the object based on at least one of the depth image and the infrared image wherein the depth image includes a first depth image and a second depth image, and
    wherein the generating of the depth image comprises:
    generating the first depth image by operating image sensor pixels that capture the light reflected from the object, according to a first operation mode; and
    generating the second depth image by operating the image sensor pixels according to a second operation mode, in a case where the first depth image satisfies a first mode transition condition associated with a recognition of an identity of the object.

2. The method according to claim 1, wherein the generating of the infrared image comprises:
    generating the infrared image by driving the pixels according to a third operation mode, in a case where the second depth image satisfies a second mode transition condition associated with a recognition of a specific part of the object.

3. The method according to claim 2, wherein the image sensor pixels include a current-assisted photonic demodulator (CAPD) pixel structured to generate a hole current in a substrate and capture photocharge generated by incident light and moved by the hole current.

4. The method according to claim 2, wherein each of the image sensor pixels includes a first control node and a second control node structured to generate a hole current by receiving a first demodulation control signal and a second demodulation control signal, respectively.

5. The method according to claim 4, wherein, in the first operation mode, each of the first demodulation control signal and the second demodulation control signal alternately has an active voltage level and an inactive voltage level depending on a first demodulation frequency.

6. The method according to claim 5,
    wherein, in the second operation mode, each of the first demodulation control signal and the second demodulation control signal alternately has the active voltage level and the inactive voltage level depending on a second demodulation frequency, and wherein the second demodulation frequency is higher than the first demodulation frequency.

7. The method according to claim 4, wherein, in the third operation mode, one of the first demodulation control signal and the second demodulation control signal has an inactive voltage level, and the other of the first demodulation control signal and the second demodulation control signal alternately has an active voltage level and the inactive voltage level.

8. The method according to claim 2, wherein the second mode transition condition includes whether a second object positioned within a second distance range in the second depth image is recognized as a specific body part.

9. The method according to claim 1, wherein the first mode transition condition includes whether a first object positioned within a first distance range in the first depth image is recognized as a human shape.

10. The method according to claim 9, further comprising:
inactivating, when the first depth image satisfies the first mode transition condition, image sensor pixels corresponding to a background area other than an image pickup area in which the first object is included.

11. The method according to claim 1, wherein the infrared image includes a plurality of consecutive frames.

12. The method according to claim 1, further comprising:
entering, before the generating of the depth image, a normal mode from a standby mode, according to a predetermined wake-up input.

13. The method according to claim 1, further comprising:
recognizing a motion based on the infrared image,
wherein the recognizing of the motion based on the infrared image comprises:
identifying a third object included in the infrared image; and
determining whether the third object is recognized as a predetermined user input by using a convolutional neural network based deep learning algorithm.

14. The method according to claim 13, further comprising:
performing an operation targeted by the recognized user input.

15. A method for recognizing a motion or gesture of an object, comprising:
operating an optical sensor device to capture light reflected from the object under illumination by light emitted toward the object;
generating, by comparing the emitted light to the reflected light, a depth image including distance information indicating a distance between the optical sensor device and the object;
generating, based on the light reflected from the object, an infrared image including infrared image information associated with the object;
determining the motion of the object based on at least one of the depth image and the infrared image; and
recognizing a motion based on the infrared image,
wherein the recognizing of the motion based on the infrared image comprises:
identifying a third object included in the infrared image; and
determining whether the third object is recognized as a predetermined user input by using a convolutional neural network based deep learning algorithm.

16. The method according to claim 15, further comprising:
performing an operation targeted by the recognized user input.

17. The method according to claim 16, wherein the operation targeted by the recognized user input includes at least one of interpreting the motion or gesture of the object associated with a sign language, determining whether the captured motion of the object matches a predetermined security key, or perceiving the motion of the object.

18. A motion recognition apparatus using a time of flight (ToF) sensor, comprising:
an image sensing device comprising a plurality of image sensor pixels responsive to light from an object to produce pixel output signals carrying image data representing captured images of the object and configured to generate first, second and third image data by operating the plurality of image sensor pixels according to first, second, and third operation modes, respectively;
an image processor in communication with the image sensing device and configured to generate a first depth image including first distance information indicating a distance between the image sensing device and the object, a second depth image including second distance information indicating a distance between the image sensing device and the object and an infrared image based on the first, second and third image data, respectively; and
an image analysis unit in communication with the image processor and configured to determine whether the first depth image satisfies a first mode transition condition and whether the second depth image satisfies a second mode transition condition, and determine a user input based on the infrared image.

19. The motion recognition apparatus according to claim 18, wherein the image processor is configured to control the image sensing device to operate in the second operation mode when the first depth image satisfies the first mode transition condition.

20. The motion recognition apparatus according to claim 18, wherein the image processor is configured to control the image sensing device to operate in the third operation mode when the second depth image satisfies the second mode transition condition.

* * * * *